(12) United States Patent
Fernandez et al.

(10) Patent No.: US 10,877,739 B1
(45) Date of Patent: Dec. 29, 2020

(54) SYSTEM AND METHOD FOR DIFFERENCING AND CONVERSION OF SOFTWARE APPLICATION CONTAINERS

(71) Applicant: Microsoft Technology Licensing, LLC, Redmond, WA (US)

(72) Inventors: Argenis Roberto Fernandez, Redmond, WA (US); Scott Konersmann, Monroe, WA (US); Georgiy Reynya, Redmond, WA (US); Stanislav A. Oks, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/455,275

(22) Filed: Jun. 27, 2019

(51) Int. Cl.
*G06F 8/61* (2018.01)
(52) U.S. Cl.
CPC ....................................... *G06F 8/63* (2013.01)
(58) Field of Classification Search
CPC .................................................... G06F 8/63
See application file for complete search history.

(56) References Cited

U.S. PATENT DOCUMENTS

| | | | |
|---|---|---|---|
| 10,402,213 B2* | 9/2019 | Stefanov | G06F 9/455 |
| 2017/0116415 A1* | 4/2017 | Stopel | G06F 21/53 |
| 2017/0177860 A1* | 6/2017 | Suarez | G06F 21/53 |
| 2018/0075152 A1* | 3/2018 | Zhang | H04L 63/126 |
| 2018/0095973 A1* | 4/2018 | Huang | G06F 8/63 |
| 2018/0321918 A1* | 11/2018 | Mcclory | H04L 63/0281 |

* cited by examiner

*Primary Examiner* — Viva Miller
(74) *Attorney, Agent, or Firm* — Fiala & Weaver P.L.L.C.

(57) ABSTRACT

Methods for differencing and conversion of software application containers are performed by systems and devices. An initiation instruction that identifies an application container image associated with an operating system is received, and a request for the container image is provided to a repository. The container image is received and a converter extracts a portion of the container image and generates another container image of the application associated with a different operating system and that includes the extracted container image portion. Difference operations are performed on layers of different container images to isolate base layers, and application artifacts are identified for conversions in layers above the operating system. Similarly, container images are converted on the basis of processor instruction sets via binary translations, and applications native to different operating systems are generated based on original container images.

20 Claims, 6 Drawing Sheets

SYSTEM AND METHOD FOR DIFFERENCING AND CONVERSION OF SOFTWARE APPLICATION CONTAINERS

BACKGROUND

Software developers and vendors may generate software applications that are utilized by consumers like businesses and end users (individuals). These software applications are specifically written for deployment to a particular platform, such as some combination of operation system, processor architecture, etc., including cloud-based platforms. However, often times software application developers, vendors, and/or consumers may wish to migrate deployments to or consume software applications on a different platform, known as "re-platforming." Current solutions for re-platforming involve refactoring or porting software application source code, i.e., separate development, using JavaScript® frameworks, Java®, and Python, and to a lesser and decreasing extent, virtual machines which have continued to decrease in adoption for new developments, due to the advent of Linux as the mainstream platform for enterprise, edge, and public cloud applications. Additionally, current re-platforming developments can result in native features of applications being unsupported or unavailable.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for differencing and conversion of software application containers are performed by systems and devices. A container conversion service is hosted on-site or in the "cloud," and provides software application developers and vendors with the ability to convert software application containers between operating systems, processor instructions sets, etc., as well as the ability to generate native software applications for different operating systems, etc., based on original container images. In one aspect, an application container image associated with an operating system, instruction set, and/or the like is retrieved or received from a container repository by an image converter. The image converter extracts a portion of the container image to generate another container image of the application. The generated container image includes the extracted portion and is associated with a different operating system, instruction set, and/or the like as compared to the original container. For determining extraction portions, difference operations are performed on layers of different container images against base containers. Base containers include only operating system layers, thus allowing application artifacts of the container images to be isolated and identified for use in container conversions. For generating software applications or application packages, such packages are generated as native to different operating systems or processor instruction sets based on original container images.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
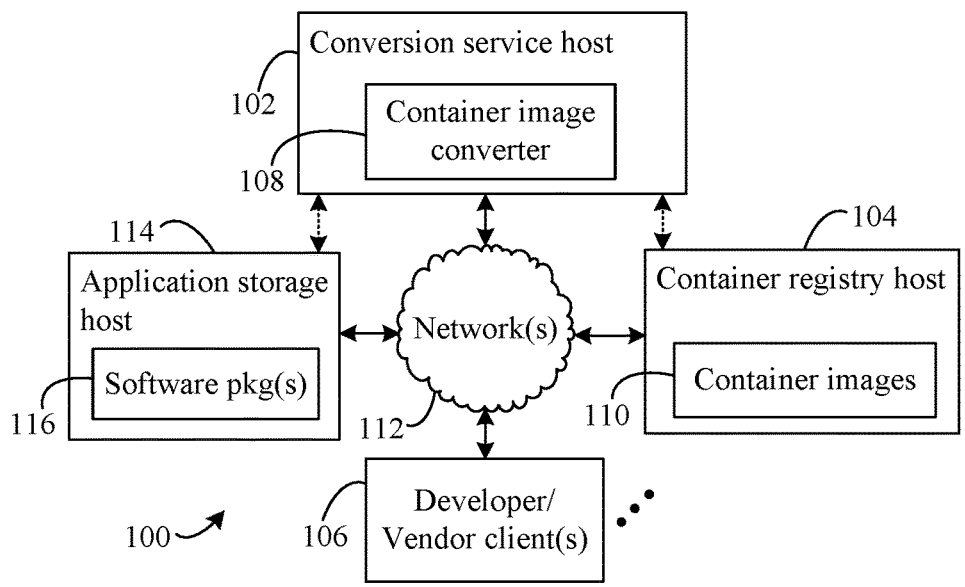
FIG. 1 shows a block diagram of a networked system for differencing and conversion of software application containers, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for differencing and conversion of software application containers. Section III below describes example mobile computing device embodiments that may be used to implement features of the embodiments described herein. Section IV below describes additional examples and advantages, and Section V provides some concluding remarks.

II. Example Embodiments for Differencing and Conversion of Software Application Containers Methods for differencing and conversion of software application containers are performed by systems and devices. In embodiments, a container conversion service that is hosted on-site or in the "cloud" provides software application developers and vendors with the ability to convert software application containers between one operating system (OS) and another, processor instructions sets, etc. The container conversion service also provides the ability to generate native software applications for different OSs, etc., based on original container images. For example, rather than port a software application from one OS to another, or from one processor instruction set to another, embodiments disclosed herein provide for the conversion of existing application containers that maintain the functionality the existing containers but allow deployment of containers to alternative platforms. Likewise, the container conversion service allows for original container images for one OS to be converted to native software applications for different OSs.

Containers are encapsulations of applications and include the libraries, dependencies, and other files, along with a base OS layer, that allow isolated execution of the application. Developers and/or vendors such as independent software vendors ("developers" generally, hereinafter) that produce and publish applications and/or containers may initially provide such applications and containers for use with a specific framework or platform, such as but not limited to, the Microsoft® Win32/.NET Framework from Microsoft Corporation of Redmond, Wash. Container images may be generated from software applications and original containers, and these container images may be pushed to and stored in container repository or registry, e.g., a cloud-based repository, from which deployment to appropriate platforms may be performed.

A developer may desire, however, to deploy container images to different platform. According to the embodiments herein, the developer may access a container conversion service, e.g., via a command line interface or the like, to initiate a container image conversion to a different OS, to a different processor instruction set, to a native application for a different OS, and/or the like. The container conversion service may be configured to request the container image from the repository and generate a converted container image according to the developer's preference. For instance, a container image for an application initially developed for a Windows® operating system from Microsoft Corporation of Redmond, Wash., may be converted to a container image for a Linux operating system to be deployed on a Linux platform, e.g., in the cloud.

Additionally, the described aspects herein enable lightweight packaging and deployment for applications, including supporting lightweight packaging and deployment of "cloud-native" applications, i.e., applications being developed for hybrid platforms such as those that span over on-premises and the cloud. The described embodiments also allow for additional deployment options for isolating and consolidating workloads through containers that are not limited to virtual machines (VMs), as well as options for emerging non-traditional development schemes such as, but not limited to, continuous integration/continuous deployment (CI/CD) pipelines, DevOps (e.g., Azure DevOps from Microsoft Corporation of Redmond, Wash.), etc. Furthermore, the described embodiments provide the ability to deploy fully functional applications via conversions across different platforms to increase options for management of application and to enable high availability/disaster recovery (HA/DR) scenarios while providing alternatives to costly refactoring options for utilization of the modernization of hosting systems, increased security, and a reduced footprint compared to traditional hardware virtualization technologies.

For instance, the described container conversion services combine new methods of virtualization for application sandboxing with resource management layers to reduce, and in some scenarios, eliminate overhead that was previously unavoidable for porting/refactoring applications for different platforms. Applications running via the described container conversions also initialize faster than even a lightweight VM while also requiring significantly less memory; accordingly, processor efficiency and reduced memory footprint are achieved for deployments across different platforms without losing application functionality. Additionally, control planes from one service can be used via container conversion for different services while bypassing the need to port, refactor, or develop control planes for these different services. Moreover, the described container conversion services enable increased flexibility of deployments to secure enclaves for multiple applications developed on different languages, rather the rigid adherence and limitations of current software development kits (SDKs). These improvements realized by the described embodiments are exemplary and illustrative in nature, and are not to be considered limiting or all-inclusive of improvements provided.

The embodiments herein also provide for the ability to determine application artifacts through container image differencing. For example, converting a container as described herein may utilize container differencing in which differences between a container to be converted and a base container are determined through differencing. That is, the compared containers may each include a common base OS layer, while the container image to be converted may include application specific artifacts that will be used to generate the converted container image that is based on an OS layer of another OS. In other words, the layers above the base layer of the original container can be positively identified to extract application-specific artifacts of the original container image to be added to the conversion container, while excluding base OS layer artifacts that are not desired in the converted container for the other OS.

Accordingly, differencing and conversion of software application containers provide for efficient, flexible, and lightweight deployments of applications over different platforms while maintaining the original application functionality.

These and further embodiments will be described in further detail below, and in the Sections/Subsections that follow.

Systems, devices, and apparatuses may be configured in various ways to perform their functions for differencing and conversion of software application containers. For instance, FIG. 1 is a block diagram of a networked system 100, according to embodiments. System 100 is configured to perform differencing and conversion of software application containers, according to embodiments. As shown in FIG. 1, system 100 includes a conversion service host 102, a container registry host 104, a developer/vendor client device(s) 106 ("client device" 106), and an application storage host 114. In embodiments, conversion service host 102, container registry host 104, client device 106, and application storage host 114 may communicate with each other over a network 112. It should be noted that various numbers of host devices and/or client devices may be present in various embodiments. Additionally, any combination of the components illustrated in FIG. 1 may be present in system 100, according to embodiments.

As noted above, conversion service host 102, container registry host 104, client device 106, and/or application storage host 114 are communicatively coupled via network 112. Network 112 may comprise any type of communication links that connect computing devices and servers such as, but not limited to, the Internet, wired or wireless networks and portions thereof, point-to-point connections, local area networks, enterprise networks, and/or the like. In some embodiments, e.g., for legacy recordings, data may also be transferred, in addition to or in lieu of, using a network, on physical storage media, between conversion service host 102, container registry host 104, client device 106, and/or application storage host 114.

One or both of conversion service host 102 or container registry host 104 may comprise one or more server computers or computing devices, which may include one or more distributed or "cloud-based" servers. In embodiments, one or both of conversion service host 102 or container registry host 104 may be associated with, or may be a part of, a cloud-based service platform such as Microsoft® Azure® from Microsoft Corporation of Redmond, Wash., and in some embodiments one or both of conversion service host 102 or container registry host 104 may comprise an on-premises server(s) in addition to, or in lieu of, cloud-based servers. Various systems/devices such as container registry host 104, and/or client devices such as client device 106 may be configured to provide data and information, including container images, conversion commands/instructions, etc., to conversion service host 102 via network 112. Conversion service host 102 may be configured generated converted container images and/or native applications based on such data and information received via network 112.

As illustrated, conversion service host 102 includes an image converter 108 that may be configured to convert container images between OSs and/or processor instruction sets, as well as to convert container images to native applications of other OSs, as described herein. Container images may be received via network 112 from container registry host 104 which may store one or more containers and/or container images 110. Further details regarding the generation of converted container images and native applications are provided below.

Application storage host 114 may also comprise one or more server computers or computing devices, which may include one or more distributed or "cloud-based" servers and/or on-premises servers as described above. Application storage host 114 may be a specific platform with respect to its OS and/or processor instruction set, and may comprise portions specific to different combinations of OS and/or processor instruction set. Application storage host 114 may host and/or store one or more applications or software packages 116 generated according to the embodiments herein and/or from developers that are specific to the platform of one or more application deployment hosts. These applications or software packages may be used to generate container images for storage at container registry host 104 as container images 110, in some embodiments. It should be noted that software packages 116 may also include one or more containers as a portion of software packages 116 from which such container images may be generated.

It should be noted that as described herein, conversion service host 102, container registry host 104, and/or application storage host 114 may be applicable to any type of system for performance of operations, including container image conversions, according to embodiments. One example of implementations noted above are "cloud" implementations, applications, or services in a network architecture/platform. A cloud platform may include a networked set of computing resources, including servers, routers, etc., that are configurable, shareable, provide data security, and are accessible over a network such as the Internet. Cloud applications/services such as for machine learning may run on these computing resources, often atop operating systems that run on the resources, for entities that access the applications/services over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

Client device 106 may be any number, type, or combination of computing devices or computing systems, including a terminal, a personal computer, a laptop computer, a tablet device, a smart phone, a personal digital assistant, a telephone, a server(s), and/or the like, including internal/external storage devices, that may be utilized to develop software packages 116, including containers, and/or to provide conversion commands/instructions to conversion service host 102. In embodiments, client device 106 may be used by various types of users, such as an administrator, support staff agents, software developers, vendors, and/or the like to publish/deploy software packages, including applications and containers, as well as to provide conversion commands/instructions to conversion service host 102. Client device 106 may include one or more user interfaces or UIs (not shown) including extensions for command line interfaces and/or UI tools, e.g., developer environments, through which conversion commands/instructions are provided.

Host devices such as conversion service host 102 may be configured in various ways for or differencing and conversion of software application containers. For instance, referring now to FIG. 2, a block diagram of a system 200 is shown for or differencing and conversion of software application containers, according to an example embodiment. System 200 may be an embodiment of system 100 of FIG. 1. System 200 is described as follows.

Figure 2:
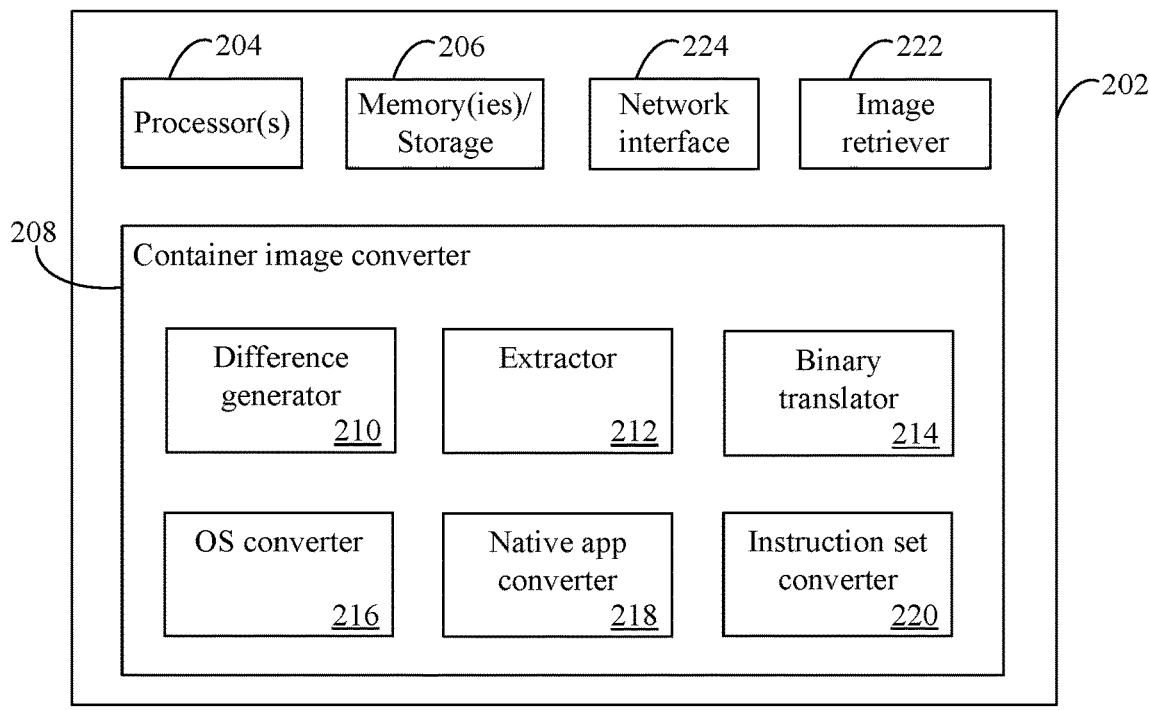
FIG. 2 shows a block diagram of a computing system configured for differencing and conversion of software application containers, according to an example embodiment.

System 200 includes a computing device 202, which may be an embodiment of conversion service host 102 of FIG. 1, which may be any type of server or computing device, including "cloud" implementations, as mentioned elsewhere herein, or as otherwise known. As shown in FIG. 2, computing device 202 may include one or more of a processor(s) ("processor") 204, one or more of a memory and/or other physical storage device ("memory") 206, as well as one or more network interfaces ("network interface") 224. Computing device 202 includes a container image converter 208 that may be an embodiment of container image converter 108. Container image converter 208 may be configured to determine differences between container images and to convert container images between different OSs and/or different processor instruction sets, and/or to convert container images to native applications of different OSs.

System 200 may also include additional components (not shown for brevity and illustrative clarity) including, but not limited to, components and subcomponents of other devices and/or systems herein, as well as those described below with respect to FIGS. 9 and 10, such as an operating system, etc.

Processor 204 and memory 206 may respectively be any type of processor circuit(s) and memory that is described herein, and/or as would be understood by a person of skill in the relevant art(s) having the benefit of this disclosure. Processor 204 and memory 206 may each respectively comprise one or more processors or memories, different types of processors or memories (e.g., a cache for query processing), remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of container image converter, which may be implemented as computer program instructions for differencing and conversion of software application containers, etc., as described herein.

Memory 206 may store container images 110 of FIG. 1 that are received for conversion, in embodiments, and may be configured to store computer program instructions/code as described above, as well as to store other information and data described in this disclosure including, without limitation, received conversion commands/instructions, base container images of different OSs, OS files for native applications, etc., and/or the like.

Network interface 224 may be any type or number of wired and/or wireless network adapter, modem, etc., configured to enable system 200, including computing device 202, to communicate with other devices and/or systems over a network, such as communications between computing device 202 and other devices, systems, hosts, of system 100 in FIG. 1 over a network such as network 112.

Container image converter 208 of computing device 202 includes a plurality of components for performing the functions and operations described herein for differencing and conversion of software application containers. For instance, container image converter 208 may be configured to receive or retrieve container images from a container registry host and convert container images between OSs and/or processor instruction sets, as well as to convert container images to native applications of other OSs, as described herein. Container images may be received or retrieved from a container registry host, such as container registry host 104 in FIG. 1, by an image retriever 222 configured to communicate the container registry host via network interface 224. As illustrated, container image converter 208 includes a difference generator 210, an extractor 212, a binary translator 214, an OS converter 216, a native application converter 218, and an instruction set converter 220.

Difference generator 210 is configured to determine differences between container images in order to identify application-specific artifacts for extraction. Extractor 212 is configured to extract the identified application-specific artifacts from container image layers above the base OS layer. Extractor 212 may be configured to provide extracted artifacts to other subcomponents of container image converter 208. Binary translator 214 may be configured to perform binary translations of executable files, e.g., that may be identified by difference generator 210 and/or extracted by extractor 212, specific to a processor instruction set in order to generate translated executable files specific to a different processor instruction set.

OS converter 216 may be configured to generate container images specific to a particular OS based at least on extracted artifacts from a different OS container received from extractor 212 and a base container image of the particular OS. Native application converter 218 may be configured to generate applications native to a particular OS based at least on extracted artifacts from a different OS container received from extractor. Instruction set converter 220 may be configured to generate container images specific to a particular processor instruction set based at least on binary translations of executable files associated with the particular instruction set, extracted artifacts from a different OS container received from extractor 212, and/or a base container image of the particular OS.

While shown separately for illustrative clarity, in embodiments, one or more of the components of container image converter 208 may be combined together and/or as a part of other components of system 200. In some embodiments, less than all of the components of container image converter 208 illustrated in FIG. 2 may be included. In software implementations, one or more components of container image converter 208 may be stored in memory 206, and may be executed by processor 204. Further details regarding container image converter 208 and its subcomponents are described below.

Figure 3:
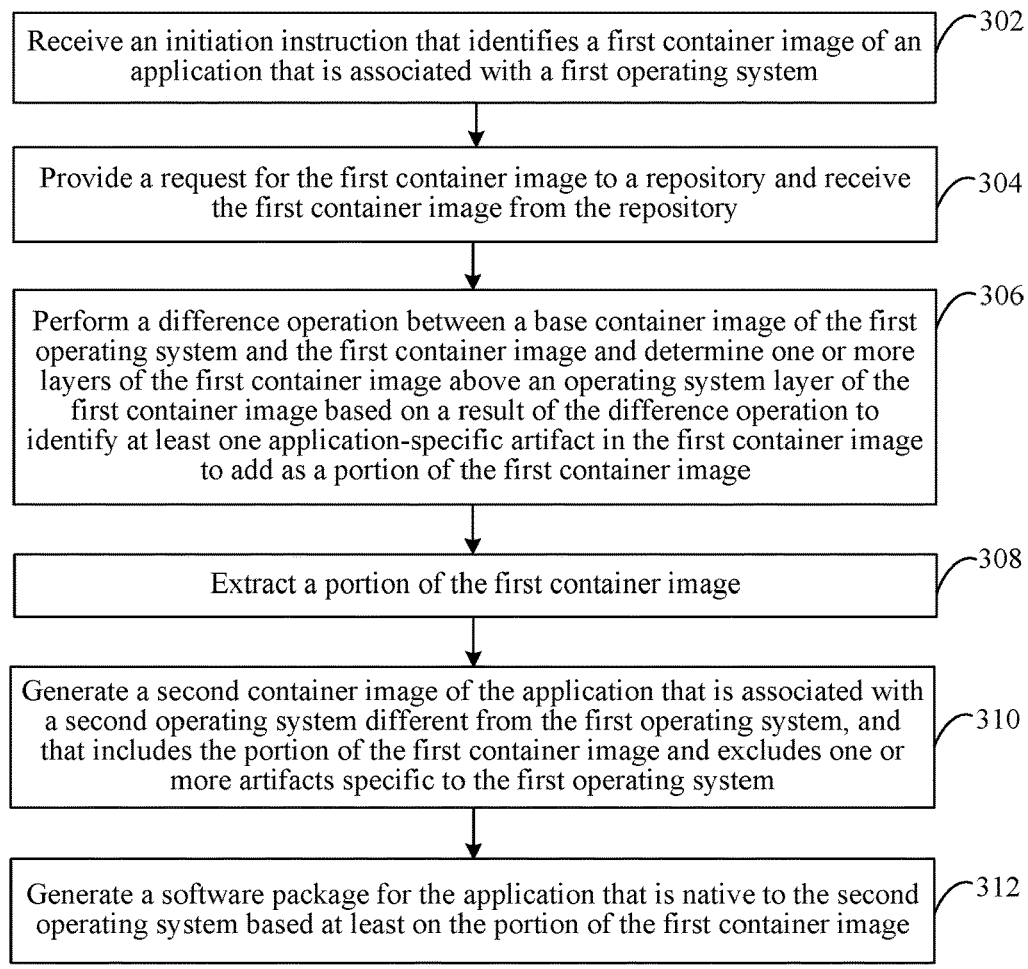
FIG. 3 shows a flowchart for differencing and conversion of software application containers, in accordance with an example embodiment.
Figure 4:
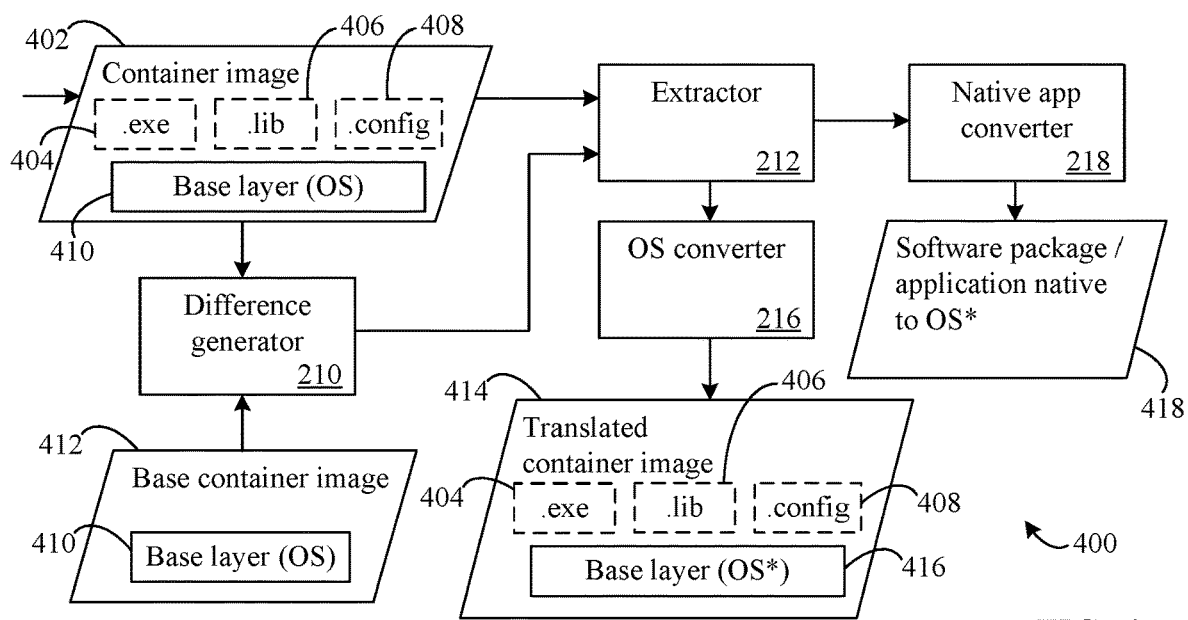
FIG. 4 shows a flow diagram of the system in FIG. 2 with respect to the flowchart of FIG. 3 for differencing and conversion of software application containers, in accordance with an example embodiment.

As noted above for FIGS. 1 and 2, embodiments herein provide for differencing and conversion of software application containers. System 100 of FIG. 1 and system 200 of FIG. 2 may each be configured to perform such functions and operations. For instance, FIGS. 3 and 4 will now be described. FIG. 3 shows a flowchart 300 and FIG. 4 shows a flow diagram 400, each being for differencing and conversion of software application containers, according to example embodiments. System 200 and container image converter 208 of computing device 202 in FIG. 2 may operate according to flowchart 300 and/or flow diagram 400 in embodiments. Further structural and operational examples will be apparent to persons skilled in the relevant art(s) based on the following descriptions. Flowchart 300 and flow diagram 400 are described as follows with respect to system 100 of FIG. 1 and system 200 of FIG. 2.

An original container image to be converted, according to the embodiments herein, may be stored at container registry host 104 of FIG. 1 as a container image of container images 110. Accordingly, container registry host 104 functions as a repository for container images 110. A developer may create a software package, an application, and/or a container generally being inclusive thereof, for deployment at an application deployment platform, which may be a platform based on the specific OS in these examples, from application storage host 114 of FIG. 1. One or more of container images 110, or copies thereof, may be provided or pushed from application storage host 114 to container registry host 104.

Flowchart 300 begins at step 302. In step 302, an initiation instruction is received that identifies a first container image of an application that is associated with a first operating system. For example, container image converter 208 of FIG. 2 may receive an initiation instruction from client device 106 of FIG. 1. A user of client device 106 may enter initiation instructions via a command line interface of client device 106 where the initiation instruction includes identifying information of a container image that the user desires to convert.

Additionally, the type of converted container image may also be specified in the initiation instruction. For example, if the original container image to be converted was developed for a specific OS, the user of client device 106 may specify a different OS (denoted generally as "OS*" which may be any other operating system) in the initiation instruction with which the resulting, converted container image is to be associated for deployment to a platform specific to OS*. Likewise, or in addition, the user of client device 106 may specify in the initiation instruction that the original container image (developed for the specific OS) be converted to a software package that is native to another OS, e.g., OS*.

In step 304, a request for the first container image is provided to a repository, and the first container image is received from the repository. For example, image retriever 222 of container image converter 208, upon receiving the initiation instruction by image converter 208, may be configured to provide requests to container registry host 104 for a container image identified in the initiation instruction of step 302. Container registry host 104 then provides the identified container image from container images 110 to image retriever 222 responsive to the request. Image retriever 222 may be configured to provide received container images to container image converter 208 and/or one or more of its subcomponents, e.g., difference generator 210.

Referring also now to FIG. 4, flow diagram 400 illustrates a container image 402 received from a repository, e.g., container registry host 104, as described in step 304 of flowchart 300. Container image 402 includes a base layer 410 corresponding to a first OS, and at least one layer above base layer 410 comprised of one or more of an executable file(s) 404, a library file(s) 406, a configuration file(s) 408, and/or the like. The example illustrated for container image 402 and the layer(s) above base layer 410 is exemplary in nature, and non-limiting, and it should be understood that different numbers of layers, and files/components thereof, while not shown for illustrative clarity and brevity, are contemplated herein.

In step 306 of flowchart 300, a difference operation is performed between a base container image of the first operating system and the first container image, and one or more layers of the first container image above an operating system layer of the first container image are determined based on a result of the difference operation to identify at least one application-specific artifact in the first container image to add as a portion of the first container image. For instance, difference generator 210 may be configured to receive the container image determine retrieved in step 304 and perform a difference operation between the retrieved container image and a base container image associated with the same OS. A difference operation as described herein may comprise determining differences between containers based on layers therein. That is, the retrieved container image and the base container image may each have a common OS layer that may be identical in each container image.

The layers above the OS layer in the retrieved container image, however, may be unique to the retrieved container image, and may be identified through the difference operation. These unique layers above the OS layer may contain artifacts of the container image that are specific to the application encapsulated by the container image. In flow diagram 400, difference generator 210 is shown as performing the difference operation for container image 402, as described in step 306 of flowchart 300, with respect to a base container image 412 that includes base layer 410. That is, difference generator 210 is configured to determine that both container image 402 and base container image 412 include base layer 410, but that container image 402 includes differences over base container 412 such as executable file(s) 404, library file(s) 406, configuration file(s) 408, and/or the like. In embodiments, not shown for brevity and illustrative clarity, differences in upper layers of container image 402 may also include a registry key(s), a performance counter(s), or a first operating system configuration parameter(s).

Accordingly, the application-specific artifacts in the unique upper layers are identified by the difference operation performed by difference generator 210 as a portion of the retrieved container image that will be added to the converted container image being generated for the user of client device 106. In embodiments, difference generator 210 may be configured to provide an indication of the differences/artifacts of container image 402 and provide such information to extractor 212, as shown in flow diagram 400.

In step 308 of flowchart 300, the portion of the first container image is extracted. For example, extractor 212 may be configured to extract the portion of the container image identified as the application-specific artifacts in step 306. Extractor 212 may copy or otherwise acquire the portion representing the application-specific artifacts from the container image which may then be stored in memory 206 or provided by extractor 212 to one or more other subcomponents of container image converter 208.

As an example, in flow diagram 400, extractor 212 may receive indicia of the application-specific artifacts from difference generator 210 and base extraction of these artifacts on the received indicia. As shown, executable file(s) 404, library file(s) 406, configuration file(s) 408, and/or the like may be identified through the differencing operation of step 306 and thus may be extracted by extractor 212. Extractor 212 may also be configured to provide extracted artifacts and information to OS converter 216 and/or native application converter 218, as shown in flow diagram 400.

In step 310 of flowchart 300, a second container image of the application is generated that is associated with a second operating system different from the first operating system, and that includes the portion of the first container image and excludes one or more artifacts specific to the first operating system. For instance, OS converter 216 may be configured generate a new, converted container image based on the original container image received/retrieved in step 304, where the new container image has a different OS* than the original container image. In embodiments, OS converter 216 receives the application-specific artifacts extracted by extractor 212 in step 308 and adds these artifacts to a base container image of the different OS* as a part of the generation of the new, converted container image. In embodiments, a layer may be generated or inserted between the different OS* layer and the application layer(s) (including the application-specific artifacts from step 308) configured to allow the application to interface with and run on the different OS*. However, the portions/artifacts of the original container specific to the original OS, as identified via the difference operation of step 306, may be excluded from the new, converted container image that is specific to the different OS*.

As shown in flow diagram 400, OS converter 216 may generate a translated container image 414 (e.g., the second container image of step 310 in flowchart 300). Translated container image 414 may be an embodiment of one of container images 110 of FIG. 1. Translated container image 414 may be generated utilizing a base container image of the different OS* having a base layer 416 of the different OS*. In some embodiments, extractor 212 may extract less than all application-specific artifacts from original container image 402 for converted, translated container image 414 and/or OS converter 216 may add less than all application-specific artifacts that were extracted from original container image 402 for converted, translated container image 414. That is, one or more of executable file(s) 404, library file(s) 406, configuration file(s) 408, and/or the like, may be used to generate translated container image 414.

In other words, in some aspects herein, a converted, new container image may also exclude some functionality of the upper layers of the original container image, e.g., when such functionality is not applicable to the different OS* of the converted, new container image, duplicate functionality, etc. Accordingly, the new, converted container image has an even smaller memory footprint, is more lightweight to decrease startup/load time, and requires fewer processing cycles during deployment execution. Still further, performance critical paths, e.g., input/output paths, are thus more direct increasing overall performance of the new, converted container image compared to originally developed containers.

In step 312 of flowchart 300, a software package for the application is generated that is native to the second operating system based at least on the portion of the first container image. For instance, native application converter 218 may be configured to generate a new, software package for the application of the original container image generated that is native to the second operating system based on the original container image received/retrieved in step 304, where the new container image has a different OS* than the original container image. In embodiments, OS converter 216 receives the application-specific artifacts extracted by extractor 212 in step 308 and adds these artifacts to a base container image of the different OS* as a part of the generation of the new, converted container image. However, the portions/artifacts of the original container specific to the original OS, as identified via the difference operation of step 306, may be excluded from the new, converted container image that is specific to the different OS*.

As illustrated in flow diagram 400, a software package 418 may be generated by native application converter 218. Software package 418 may be an embodiment of software package(s) 116 of FIG. 1. Software package 418 as shown is specific to the different OS*, is native to an application deployment platform on which OS* is running, and is based on a conversion of container image 402, e.g., is based on extracted application-specific artifacts, as described herein, e.g., executable file(s) 404, library file(s) 406, configuration file(s) 408, and/or the like.

Figure 5:
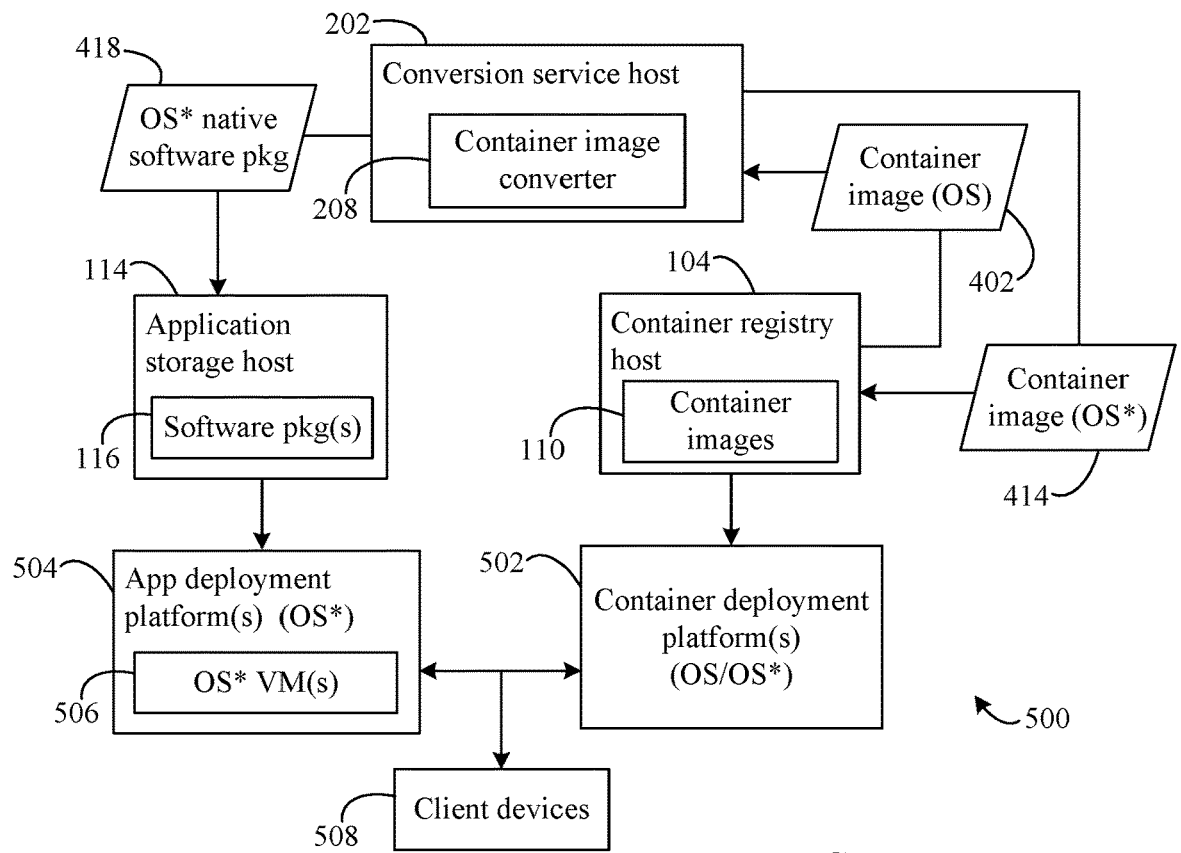
FIG. 5 shows a flow diagram of the systems in in FIGS. 1 and 2 for differencing and conversion of software application containers for deployment, in accordance with an example embodiment.

FIG. 5 shows a flow diagram of the systems in in FIGS. 1 and 2 for differencing and conversion of software application containers for deployment, in accordance with an example embodiment. System 100 of FIG. 1 and system 200 of FIG. 2 may operate according to flow diagram 500 in embodiments. Flow diagram 500 may be an embodiment of flow diagram 400 of FIG. 4. Further structural and operational examples will be apparent to persons skilled in the relevant art(s) based on the following descriptions. Flow diagram 500 is described as follows with respect to system 100 of FIG. 1 and system 200 of FIG. 2, and with respect to flow diagram 400.

As shown above in flow diagram 400, container image 402 associated with an original OS may be received by conversion service host 202 and container image converter 208 from container images 110 of container registry host 104. Container image 414 associated with a different OS* may be generated based on container image 402 through flow diagram 400. Subsequent to its generation, container image 414 may be provided to container registry host 104 for storing as one of container images 110. Likewise, the OS* native software package 418 may be generated based on container image 402 through flow diagram 400. Subsequent to its generation, software package 418 may be provided to application storage host 114 for storing as one of software package(s) 116.

When container images and/or software packages associated with a different OS*, and generated from an original container image for an original OS (e.g., container image 402), are to be deployed for execution to their respective platforms that are also associated with OS*, deployment may be performed from container registry host 104 and/or application storage host 114, respectively. For example, container image 414 may be deployed from container registry host 104 and container images 110 to a container deployment platform 502, while software package 418 may be deployed from application storage host 114 and software packages 116 to an application deployment platform 504.

Container deployment platform 502 and/or application deployment platform 504 may each comprise one or more server computers or computing devices, which may include one or more distributed or "cloud-based" servers and/or on-premises servers as described herein. The illustrated platforms may be platforms specific with respect to their operating systems and/or processor instruction sets that match the requirements for deployment of container image 414 and/or software package 418. Container deployment platform 502 may include different portions for executing containers specific to different OSs, e.g., Windows®, Linux, etc., and application deployment platform 504 may also be so configured for execution of software packages for specific OSs. In this regard, application deployment platform 504 may be configured to execute one or more virtual machines 506 (VMs) that are specific to OS* to execute software package 418, according to embodiments.

Once deployed to their respective platform(s) (e.g., container deployment platform 502 and/or application deployment platform 504), container image 414 and/or software package 418 may be executed to perform their functions and may be accessible for use by clients, tenants, user, etc., via one or more client devices 808, including but not limited to, various types of computing devices and/or mobile devices as described herein.

Again, with reference to FIGS. 1 and 2, further embodiments herein are described for differencing and conversion of software application containers. That is, system 100 of FIG. 1 and system 200 of FIG. 2 may each be configured to perform such functions and operations. As an example, in lieu of, or in addition to, a user of client device 106 specifying a different OS* for generation of converted container images and/or native software packages, the user may specify a processor instruction set for a resulting, converted container image that is different than the processor instruction set of the container image to be converted.

Figure 6:
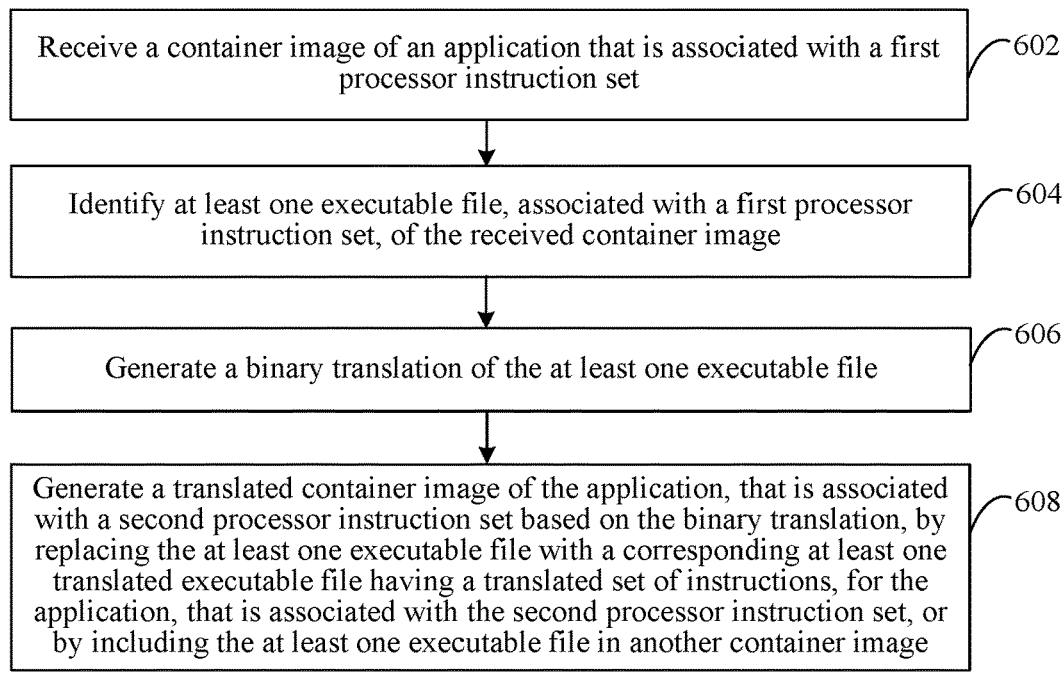
FIG. 6 shows a flowchart for differencing and conversion of software application containers, in accordance with an example embodiment.
Figure 7:
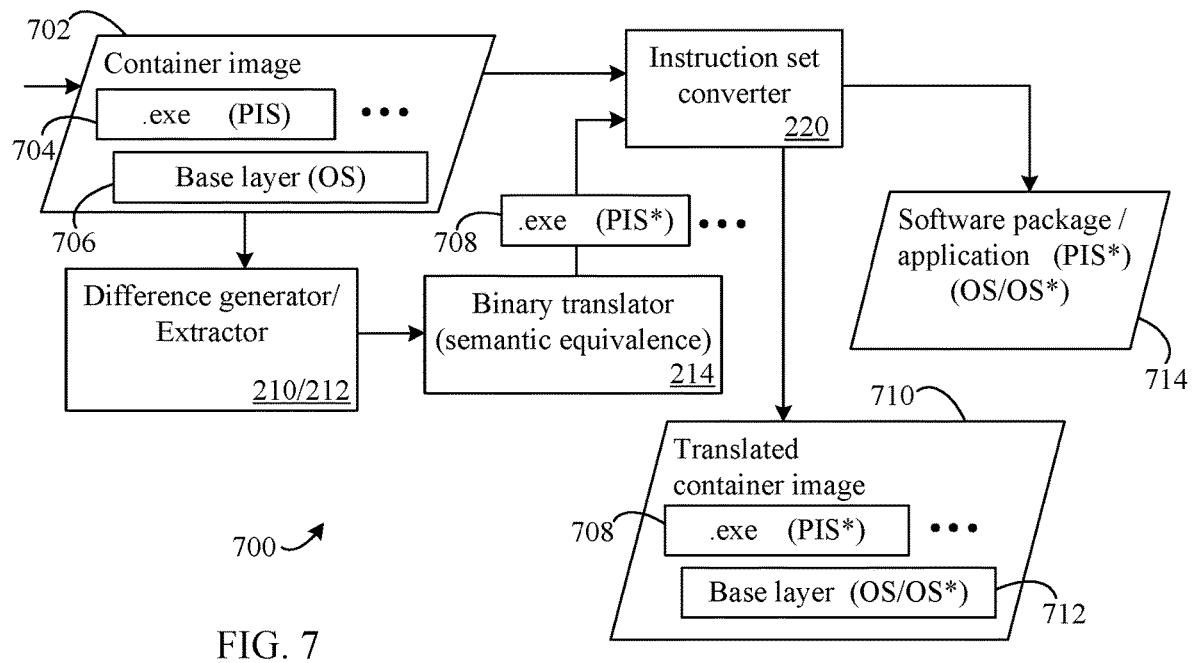
FIG. 7 shows a flow diagram of the system in FIG. 2 with respect to the flowchart of FIG. 6 for differencing and conversion of software application containers, in accordance with an example embodiment.

For instance, FIG. 6 and FIG. 7 will now be described. FIG. 6 shows a flowchart 600, and FIG. 7 shows a flow diagram 700, for differencing and conversion of software application containers, according to example embodiments. System 200 and container image converter 208 of computing device 202 in FIG. 2 may operate according to flowchart 600 and/or flow diagram 700 in embodiments. Further structural and operational examples will be apparent to persons skilled in the relevant art(s) based on the following descriptions. Flowchart 600 may be an embodiment of flowchart 300 of FIG. 3 and flow diagram 700 may be an embodiment of flow diagram 500. Flowchart 600 and flow diagram 700 are described as follows with respect to system 100 of FIG. 1 and system 200 of FIG. 2. Flowchart 600 begins at step 602.

In step 602, a container image of an application that is associated with a first processor instruction set is received. In embodiments, step 602 may be an embodiment of step 304 of flowchart 300 where step 302 specifies that the initiation instruction references a specific, different processor instruction set for the conversion of a container that is received from container registry host 104. For example, container image converter 208 in FIG. 2 may receive an initiation instruction from client device 106 of FIG. 1. A user of client device 106 may enter initiation instructions via the command line interface of client device 106 where the initiation instruction includes identifying information of a container image that the user desires to convert. A request for the container image may be provided to, and the container image received from, container registry host 104.

Additionally, the type of converted container image may also be specified in the initiation instruction. For example, if the original container image to be converted was developed for a specific processor instruction set (i.e., an original processor instruction set ("PIS")), the user of client device 106 may specify a different processor instruction set (denoted generally as "PIS*" which may be any other processor instruction set) in the initiation instruction with which the resulting, converted container image is to be associated for deployment to a platform specific to PIS*. Likewise, or in addition, the user of client device 106 may specify in the initiation instruction that the original container image (developed for the specific PIS) be converted to a software package for another, different PIS, e.g., PIS*.

Referring also now to FIG. 7, flow diagram 700 illustrates a container image 702 received from a repository, e.g., container registry host 104, as described herein. Container image 702 includes a base layer 706 corresponding to a first OS, and at least one layer above base layer 706 comprised of one or more of executable files 704 for a first PIS which may include one or more library files (e.g., .dll files, etc.). While not shown for brevity and illustrative clarity, layers above base layer 706 may also include one or more library files, configuration files, and/or the like. The example illustrated for container image 702 and the layer(s) above base layer 706 is exemplary in nature, and non-limiting, and it should be understood that different numbers of layers, and files/components thereof, are contemplated herein.

In step 604, at least one executable file, associated with a first processor instruction set, of the received container image is identified. For instance, difference generator 210 may be configured to identify executable files 704 of container image 702 received in step 602 via a differencing operation, as described above, and/or via identifying characteristics of executable files 704, e.g., extensions and/or the like. Extractor 212 may then be configured to extract, or generate a copy of, the executable file(s) and provide the file(s)/copy(ies) for storage in memory 206 or provision to one or more other subcomponents of container image converter 208, such as binary translator 214.

With reference again to flow diagram 700, difference generator 210 and/or extractor 212 may be configured to provide identified executable files 704 of container image 702 to binary translator 214. In some embodiments, binary translator 214 is configured to retrieve the identified executable files 704 from memory if stored.

In step 606, a binary translation of the at least one executable file is generated. For example, binary translator 214 may be configured to generate binary translations of executable files. That is, binary translator 214 may be configured to generate a binary file associated with a different PIS* based on a translation of a binary file associated with an original PIS. As described herein, a translated set of instructions for translated container image 710 (or a software package/application described below), that is associated with the different processor instruction set PIS*, is generated to be semantically equivalent to the set of instructions PIS of executable files 704 of container image 702.

As a non-limiting example referencing flow diagram 700, binary translator 214 may receive executable files 704 associated with the original PIS (e.g., a processor instruction set for an Intel® processor) and generate one or more of executable files 708 associated with the different PIS* (e.g., a processor instruction set for an Arm® processor). The generated executable files 708 may be provided from binary translator 214 to instruction set converter 220.

In step 608, a translated container image of the application, that is associated with a second processor instruction set based on the binary translation, is generated by replacing the at least one executable file with a corresponding at least one translated executable file having a translated set of instructions, for the application, that is associated with the second processor instruction set, or by including the at least one executable file in another container image. For instance, instruction set converter 220 may be configured to generate translated container images associated with a second processor instruction set (e.g., PIS*) using the binary translations from binary translator 214.

As shown in flow diagram 700, a translated container image 710 is generated by instruction set converter 220. Translated container image 710 may include the same base layer for the OS as in container image 702, but includes executable files 708 associated with PIS*. Translated container image 710 may be generated by replacing executable files 704 for PIS with translated executable files 708 for PIS* in container image 702, or by including translated executable files 708 for PIS* in a base container image along with any other associated container image files for the application in layers above the base layer of the operating system.

Additionally, translated container image 710 may also include a base layer 712 that is associated with either OS or OS* as described above. In embodiments where an OS conversion for a container image is also desired as described above for FIGS. 3 and 4, in addition to an instruction set conversion, these conversions may be performed serially, concurrently, or partially concurrently. For example, also illustrated in flow diagram 700 is a software package 714 that is associated with the different processor instruction set PIS*. Software package 714 may be generated as similarly described above for flowchart 300 of FIG. 3 and/or flow diagram 400 of FIG. 4 with the addition of the steps in flowchart 600 and/or flow diagram 700.

Figure 8:
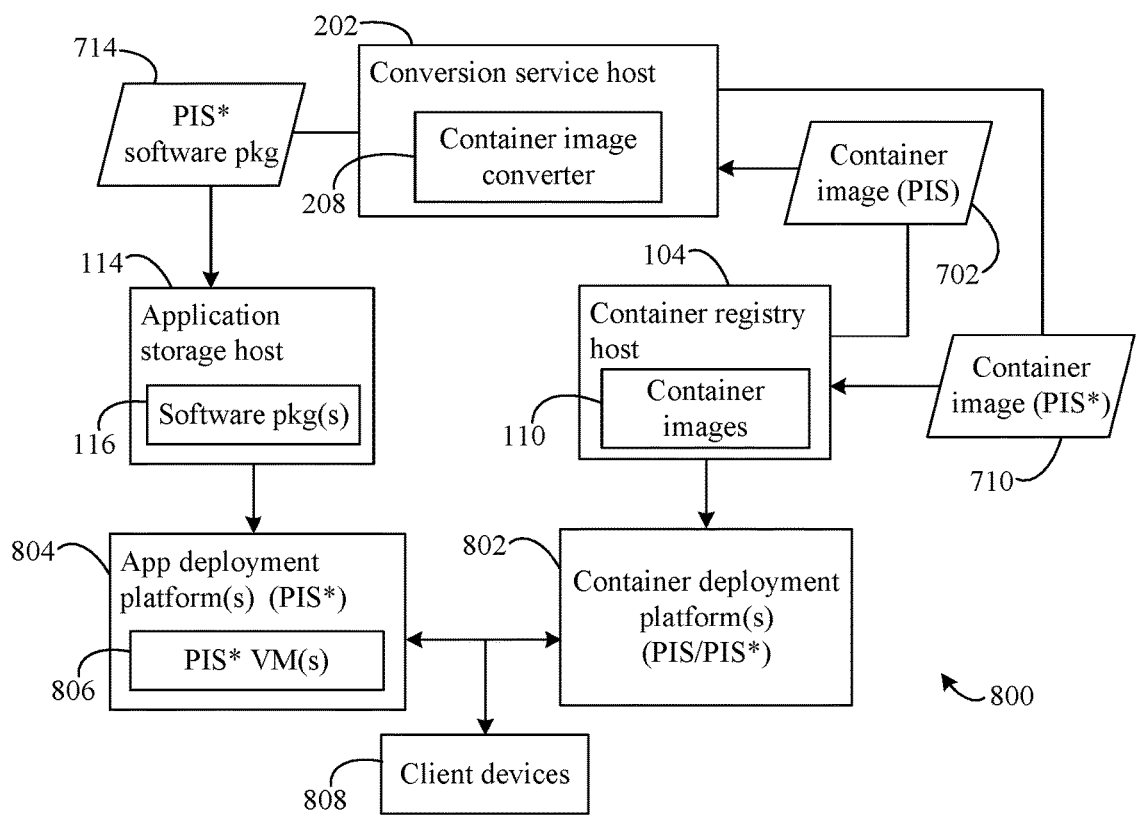
FIG. 8 shows a flow diagram of the systems in FIGS. 1 and 2 for differencing and conversion of software application containers for deployment, in accordance with an example embodiment.

Referring also now to FIG. 8, a flow diagram of the systems in FIGS. 1 and 2 for differencing and conversion of software application containers for deployment is shown, in accordance with an example embodiment. System 100 of FIG. 1 and system 200 of FIG. 2 may operate according to flow diagram 800 in embodiments. Flow diagram 800 may be an embodiment of flow diagram 700 of FIG. 7. Further structural and operational examples will be apparent to persons skilled in the relevant art(s) based on the following descriptions. Flow diagram 800 is described as follows with respect to system 100 of FIG. 1 and system 200 of FIG. 2, and with respect to flow diagram 400.

As shown above in flow diagram 700, container image 702 associated with an original PIS may be received by conversion service host 202 and container image converter 208 from container images 110 of container registry host 104. Container image 710 associated with a different PIS* may be generated based on container image 702 through flow diagram 700. Subsequent to its generation, container image 710 may be provided to container registry host 104 for storing as one of container images 110. Likewise, a software package 714 for PIS* may be generated based on container image 702 through flow diagrams 400 and/or 700. Subsequent to its generation, software package 714 may be provided to application storage host 114 for storing as one of software package(s) 116.

When container images and/or software packages associated with a different PIS* (e.g., container image 710 and software package 714), and generated from an original container image for an original PIS (e.g., container image 702), are to be deployed for execution to their respective platforms that include processor resources associated with PIS*, deployment may be performed from container registry host 104 and/or application storage host 114, respectively. For example, container image 710 may be deployed from container registry host 104 and container images 110 to a container deployment platform 802, while software package 714 may be deployed from application storage host 114 and software packages 116 to an application deployment platform 804.

Container deployment platform 802 and/or application deployment platform 804 may each comprise one or more server computers or computing devices, which may include one or more distributed or "cloud-based" servers and/or on-premises servers as described herein. These illustrated platforms may be platforms specific with respect to their operating systems and/or processor instruction sets that match the requirements for deployment of container image 710 and/or software package 714. Container deployment platform 802 may include different portions for executing containers specific to different PISs, e.g., Intel® processors, Arm® processors, etc., and application deployment platform 804 may also be so configured for execution of software packages for specific PISs. In this regard, application deployment platform 804 may be configured to execute one or more virtual machines 806 (VMs) that are specific to PIS* to execute software package 714, according to embodiments.

Once deployed to their respective platform(s) (e.g., container deployment platform 802 and/or application deployment platform 804), container image 710 and/or software package 714 may be executed to perform their functions and may be accessible for use by clients, tenants, user, etc., via one or more client devices 808, including but not limited to, various types of computing devices and/or mobile devices as described herein.

In embodiments, one or more of container deployment platform 502, application deployment platform 504, container deployment platform 802, and/or application deployment platform 804 may be hosted by the same server(s) and/or the same overarching cloud-based platform.

III. Example Mobile and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including, such as system 100 of FIG. 1, and system 200 of FIG. 2, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 9:
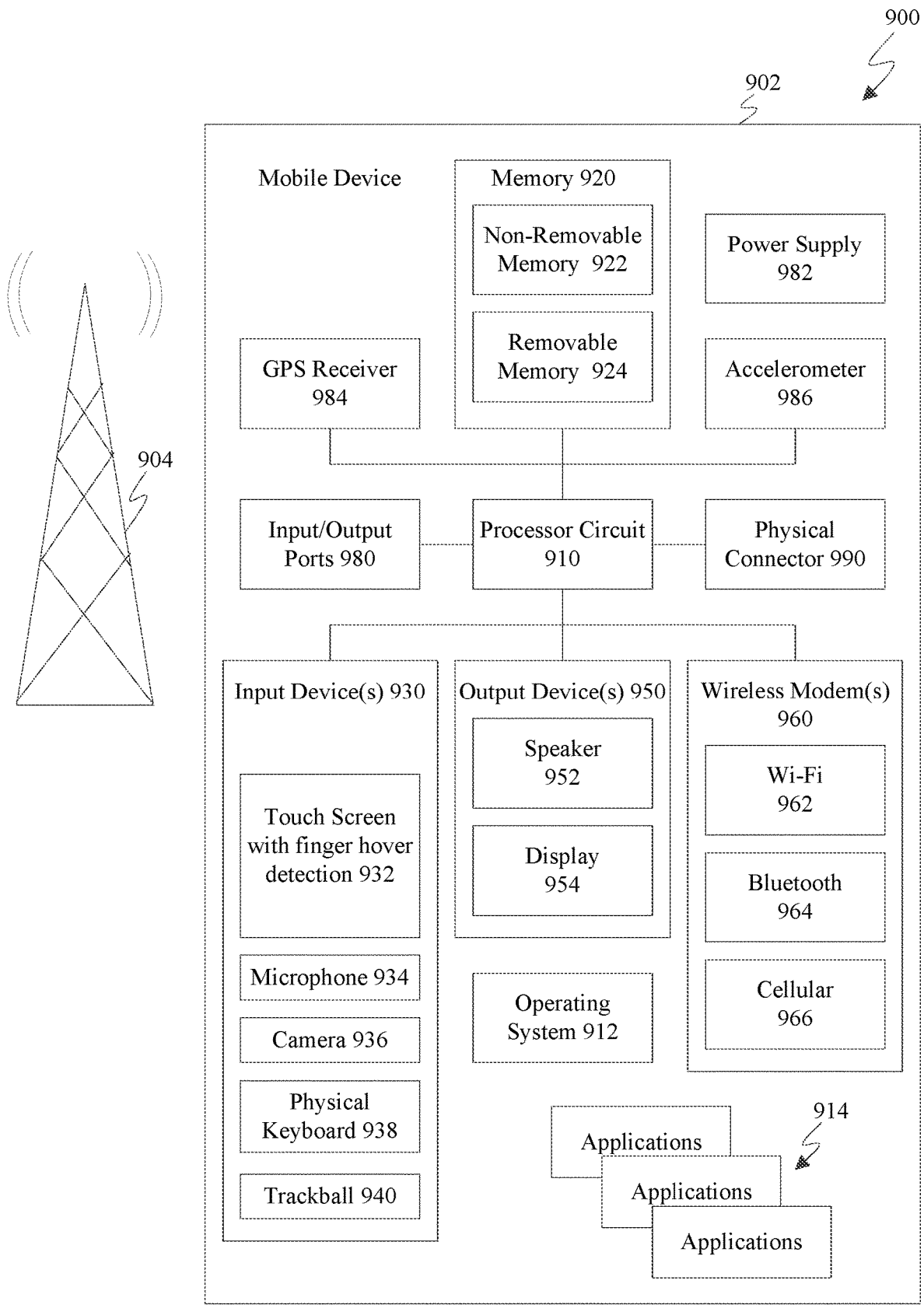
FIG. 9 shows a block diagram of an example mobile system that may be used to implement embodiments.

FIG. 9 is a block diagram of an exemplary mobile system 900 that includes a mobile device 902 that may implement embodiments described herein. For example, mobile device 902 may be used to implement any system, client, or device, or components/subcomponents thereof, in the preceding sections. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smart phone, handheld computer, Personal Digital Assistant (PDA), etc.) and can allow wireless two-way communications with one or more mobile communications networks 904, such as a cellular or satellite network, or with a local area or wide area network.

Mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, web browsers, messaging applications) and any other computing applications (e.g., word processing applications, mapping applications, media player applications).

Mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and application programs 914. Example data can include web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing one or more of system 100 of FIG. 1, and system 200 of FIG. 2, along with any components and/or subcomponents thereof, as well any operations and portions of flowcharts/flow diagrams described herein and/or further examples described herein.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Other possible output devices (not shown) can include piezoelectric or other haptic output devices. Some devices can serve more than one input/output function. For example, touch screen 932 and display 954 can be combined in a single input/output device. Input devices 930 can include a Natural User Interface (NUI).

One or more wireless modems 960 can be coupled to antenna(s) (not shown) and can support two-way communications between processor 910 and external devices, as is well understood in the art. Modem 960 is shown generically and can include a cellular modem 966 for communicating with the mobile communication network 904 and/or other radio-based modems (e.g., Bluetooth 964 and/or Wi-Fi 962). At least one wireless modem 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to implement any of the above-described features of flowcharts/embodiments herein, and/or to access and utilize converted container images and software packages as described. Computer program logic for performing any of the operations, steps, and/or functions described herein may be stored in memory 920 and executed by processor 910.

Figure 10:
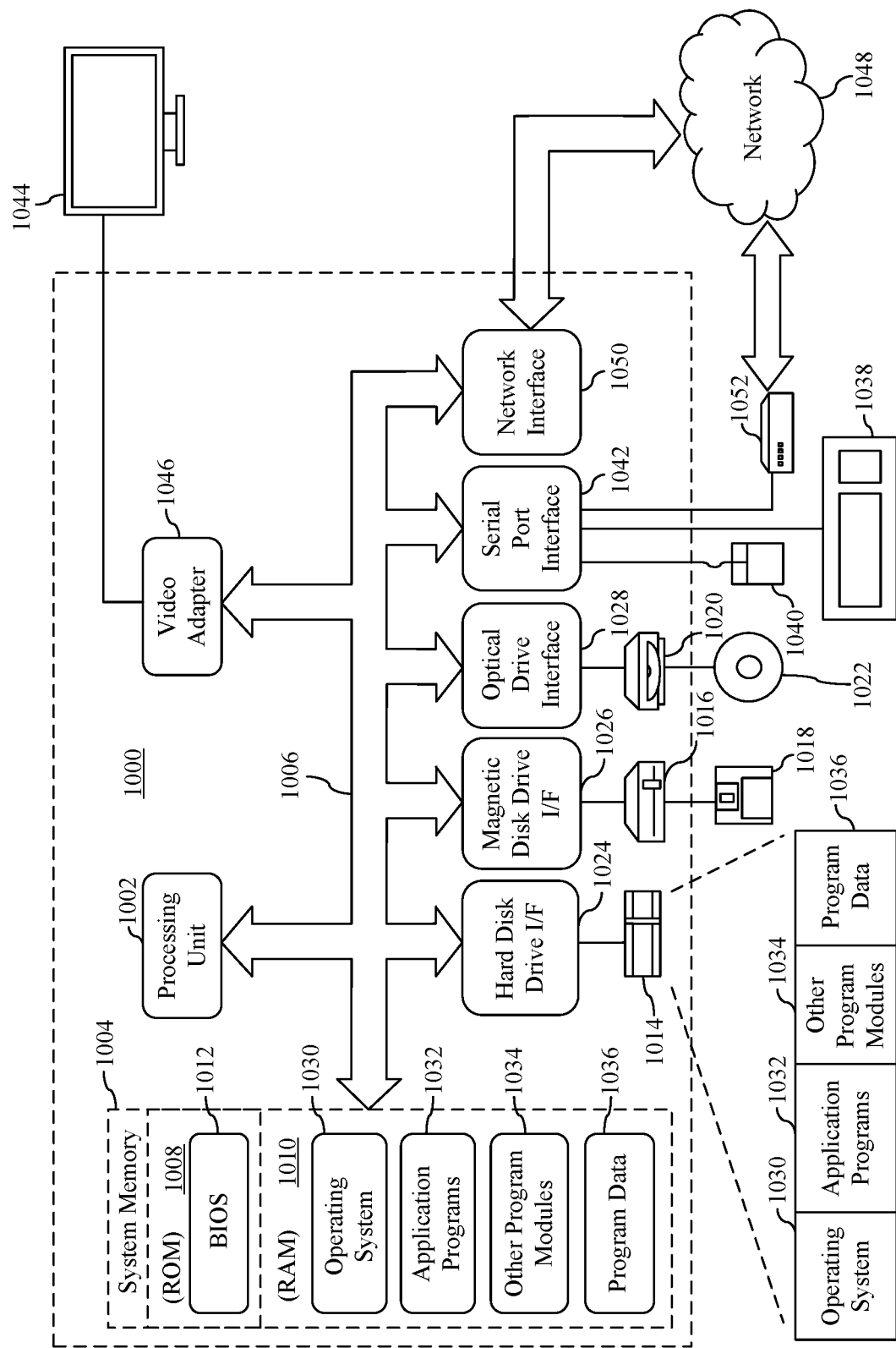
FIG. 10 shows a block diagram of an example computing device that may be used to implement embodiments.

FIG. 10 depicts an exemplary implementation of a computing device 1000 in which embodiments may be implemented. For example, embodiments described herein may be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems and/or game consoles, etc., as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing embodiments described herein, such as but not limited to, system 100 of FIG. 1, and system 200 of FIG. 2, along with any components and/or subcomponents thereof, as well as the flowcharts/flow diagrams described herein, including portions thereof, and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

The described container conversion services combine new methods of virtualization for application sandboxing with resource management layers to reduce, and in some scenarios, eliminate overhead that was previously unavoidable for porting/refactoring applications for different platforms. Applications running via the described container conversions also initialize faster than even a lightweight VM while also requiring significantly less memory; accordingly, processor efficiency and reduced memory footprint are achieved for deployments across different platforms without losing application functionality. Additionally, control planes from one service can be used via container conversion for different services while bypassing the need to port, refactor, or develop control planes for these different services. Moreover, the described container conversion services enable increased flexibility of deployments to secure enclaves for multiple applications developed on different languages, rather the rigid adherence and limitations of current software development kits (SDKs).

The embodiments herein also provide for the ability to determine application artifacts through container image differencing. Converting/translating a container image as described herein may utilize container differencing in which differences between a container to be converted and a base container are determined through differencing, which was previously not available for software services and applications, or for differencing and conversion of software application containers.

Furthermore, it is also contemplated herein that embodiments herein encompass not only combinations of operating system and/or processor/architecture instruction set conversions, but also different types of container image conversions, alone or in combination, for secure enclave operability, application fabric operability, cloud platform operability, and/or the like.

The additional examples and embodiments described in this Section may be applicable to examples disclosed in any other Section or subsection of this disclosure.

Embodiments in this description provide for systems, devices, and methods for differencing and conversion of software application containers. For instance, a system is described herein. The system may be configured and enabled in various ways for such differencing and conversion of software application containers, as described herein. The system includes a processing system that includes one or more processors, and a memory configured to store computer program instructions to be executed by the processing system. The computer program instructions include an image retriever configured to receive an initiation instruction that identifies a first container image of an application that is associated with a first operating system, provide a request for the first container image to a repository, and receive the first container image from the repository. The computer program instructions also include an image converter configured to extract a portion of the first container image, and generate a second container image of the application that is associated with a second operating system different from the first operating system and that includes the portion of the first container image.

In an embodiment of the system, to generate the second container image, the image converter is configured to add the portion of the first container image to a base container of the second operating system.

In an embodiment of the system, to extract the portion of the first container image, the image converter is configured to identify and add at least one application-specific artifact in the first container image as the portion of the first container image, and exclude one or more artifacts in the first container image that are specific to the first operating system from the portion of the first container image.

In an embodiment of the system, to identify the at least one application-specific artifact, the image converter is configured to perform a difference operation between a base container image of the first operating system and the first container image, determine one or more layers of the first container image above an operating system layer of the first container image based on a result of the difference operation, and identify the at least one application-specific artifact from the one or more layers.

In an embodiment of the system, the image retriever is configured to provide the second container image to the repository, and the repository is configured to store the second container image, and enable deployment of the second container image to a cloud-based platform that executes the second operating system.

In an embodiment of the system, the image converter is configured to generate a software package for the application that is native to the second operating system based at least on the portion of the first container image, store the software package in an application storage.

In an embodiment, the system further includes the application storage, and the application storage is configured to enable deployment of the software package to a cloud-based platform that executes the second operating system.

In an embodiment of the system, the image converter is configured to identify at least one executable file, associated with a first processor instruction set, of the second container image, generate a binary translation of the at least one executable file, and generate a translated container image of the application that is associated with a second processor instruction set based on the binary translation, the translated container image also being associated with the second operating system.

A computer-implemented method is also described herein. The computer-implemented method may be for differencing and conversion of software application containers, as described herein. The computer-implemented method includes receiving a first container image of an application that is associated with a first operating system, performing a difference operation between a base container image of the first operating system and the first container image, determining one or more layers of the first container image above an operating system layer of the first container image based on a result of the difference operation, and identifying at least one application-specific artifact from the one or more layers.

In an embodiment, the computer-implemented method includes generating, based at least on the at least one application-specific artifact, a second container image of the application that is associated with a second operating system different from the first operating system.

In an embodiment, the computer-implemented method includes generating, based at least on the at least one application-specific artifact, a software package for the application that is native to a second operating system different from the first operating system.

In an embodiment of the computer-implemented method, the at least one application-specific artifact includes one or more of at least one executable file, at least one library file, at least one configuration file, a registry key, a performance counter, or a first operating system configuration parameter.

In an embodiment of the computer-implemented method, performing the difference operation includes determining one or more portions of the base container image that are present in the first container image, and identifying the one or more layers that are absent from the base container image.

A computer-readable storage medium having program instructions recorded thereon that, when executed by at least one processing device, perform a method, is also described. The method may be for differencing and conversion of software application containers, as described herein. The method includes receiving a container image of an application that is associated with a first processor instruction set, identifying at least one executable file, associated with the first processor instruction set, of the received container image, generating a binary translation of the at least one executable file, and generating, based on the binary translation, another container image of the application that is associated with a second processor instruction set different from the first processor instruction set.

In an embodiment of the computer-readable storage medium, the binary translation includes a translated set of instructions, for the application, that is associated with the second processor instruction set and that is semantically equivalent to a set of instructions of the at least one executable file.

In an embodiment of the computer-readable storage medium, generating the other container image of the application includes replacing the at least one executable file with a corresponding at least one translated executable file having a translated set of instructions, for the application, that is associated with the second processor instruction set.

In an embodiment of the computer-readable storage medium, the at least one executable file includes one or more of at least one executable program file or at least one executable library file.

In an embodiment of the computer-readable storage medium, the method includes, prior to receiving the container image of the application that is associated with the first processor instruction set, receiving an initial container image of an application, from a repository, the initial container image associated with a first operating system, extracting a portion of the initial container image, and generating the container image, the generated container image being associated with a second operating system different from the first operating system and including the portion of the initial container image.

In an embodiment of the computer-readable storage medium, extracting the portion of the initial container image includes identifying at least one application-specific artifact in the initial container image to add as the portion of the initial container image, and excluding one or more artifacts in the initial container image that are specific to the first operating system from the portion of the initial container image.

In an embodiment of the computer-readable storage medium, the method includes providing the generated container image to the repository, the repository being configured to store the generated container image, and enable deployment of the stored container image to a cloud-based platform that executes the second operating system. In the embodiment, said receiving a container image of an application that is associated with a first processor instruction set includes receiving the stored container image.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system comprising:
a processing system that includes one or more processors; and
a memory that stores computer program instructions that are executable by the processing system, the computer program instructions comprising:
an image retriever configured to:
receive an initiation instruction that identifies a first container image of an application that is associated with a first operating system;
provide a request for the first container image to a repository; and
receive the first container image from the repository; and
an image converter configured to:
extract a portion of the first container image; and
generate a second container image of the application that is associated with a second operating system different from the first operating system and that includes the portion of the first container image.

2. The system of claim 1, wherein, to generate the second container image, the image converter is configured to:
add the portion of the first container image to a base container of the second operating system.

3. The system of claim 2, wherein, to extract the portion of the first container image, the image converter is configured to:
identify and add at least one application-specific artifact in the first container image as the portion of the first container image; and
exclude one or more artifacts in the first container image that are specific to the first operating system from the portion of the first container image.

4. The system of claim 3, wherein, to identify the at least one application-specific artifact, the image converter is configured to:
perform a difference operation between a base container image of the first operating system and the first container image;
determine one or more layers of the first container image above an operating system layer of the first container image based on a result of the difference operation; and
identify the at least one application-specific artifact from the one or more layers.

5. The system of claim 1, wherein the image retriever is configured to provide the second container image to the repository; and
wherein the repository is configured to:
store the second container image; and
enable deployment of the second container image to a cloud-based platform that executes the second operating system.

6. The system of claim 1, wherein the image converter is configured to:
generate a software package for the application that is native to the second operating system based at least on the portion of the first container image; and
store the software package in an application storage.

7. The system of claim 6, further comprising the application storage;
wherein the application storage is configured to enable deployment of the software package to a cloud-based platform that executes the second operating system.

8. The system of claim 1, wherein the image converter is configured to:
identify at least one executable file, associated with a first processor instruction set, of the second container image;
generate a binary translation of the at least one executable file; and
generate a translated container image of the application that is associated with a second processor instruction set based on the binary translation, the translated container image also being associated with the second operating system.

9. A computer-implemented method, comprising:
receiving a first container image of an application that is associated with a first operating system;
performing a difference operation between a base container image of the first operating system and the first container image;
determining one or more layers of the first container image above an operating system layer of the first container image based on a result of the difference operation; and
identifying at least one application-specific artifact from the one or more layers.

10. The computer-implemented method of claim 9, further comprising:
generating, based at least on the at least one application-specific artifact, a second container image of the application that is associated with a second operating system different from the first operating system.

11. The computer-implemented method of claim 9, further comprising:
generating, based at least on the at least one application-specific artifact, a software package for the application that is native to a second operating system different from the first operating system.

12. The computer-implemented method of claim 9, wherein the at least one application-specific artifact includes one or more of:
at least one executable file, at least one library file, at least one configuration file, a registry key, a performance counter, or a first operating system configuration parameter.

13. The computer-implemented method of claim 9, wherein performing the difference operation comprises:
determining one or more portions of the base container image that are present in the first container image; and
identifying the one or more layers that are absent from the base container image.

14. A computer-readable storage medium having program instructions recorded thereon that, when executed by at least one processing device, perform a method comprising:
receiving a container image of an application that is associated with a first processor instruction set;
identifying at least one executable file, associated with the first processor instruction set, of the received container image;
generating a binary translation of the at least one executable file; and
generating, based on the binary translation, another container image of the application that is associated with a second processor instruction set different from the first processor instruction set.

15. The computer-readable storage medium of claim 14, wherein the binary translation includes:
a translated set of instructions, for the application, that is associated with the second processor instruction set and that is semantically equivalent to a set of instructions of the at least one executable file.

16. The computer-readable storage medium of claim 14, wherein generating the other container image of the application comprises:
replacing the at least one executable file with a corresponding at least one translated executable file having a translated set of instructions, for the application, that is associated with the second processor instruction set.

17. The computer-readable storage medium of claim 14, wherein the at least one executable file includes one or more of:
at least one executable program file; or
at least one executable library file.

18. The computer-readable storage medium of claim 14, wherein the method comprises, prior to receiving the container image of the application that is associated with the first processor instruction set:
receiving an initial container image of an application, from a repository, the initial container image associated with a first operating system;
extracting a portion of the initial container image; and
generating the container image, the generated container image being associated with a second operating system different from the first operating system and including the portion of the initial container image.

19. The computer-readable storage medium of claim 18, wherein extracting the portion of the initial container image comprises:
identifying at least one application-specific artifact in the initial container image to add as the portion of the initial container image; and
excluding one or more artifacts in the initial container image that are specific to the first operating system from the portion of the initial container image.

20. The computer-readable storage medium of claim 18, wherein the method comprises:
providing the generated container image to the repository, the repository being configured to:
store the generated container image; and
enable deployment of the stored container image to a cloud-based platform that executes the second operating system;
wherein said receiving a container image of an application that is associated with a first processor instruction set comprises:
receiving the stored container image.

* * * * *